Figure 1:
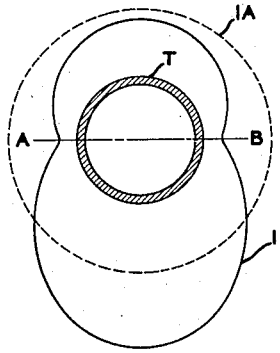

June 1, 1937.  J. G. ALTHER  2,081,971

PROCESS OF HEATING OIL TO CRACKING TEMPERATURES

Original Filed Feb. 15, 1932   3 Sheets-Sheet 1

INVENTOR
JOSEPH G. ALTHER
BY Frank L. Belknap
ATTORNEY

June 1, 1937.　　　J. G. ALTHER　　　2,081,971
PROCESS OF HEATING OIL TO CRACKING TEMPERATURES
Original Filed Feb. 15, 1932　　3 Sheets-Sheet 2

INVENTOR
JOSEPH G. ALTHER
ATTORNEY

INVENTOR
JOSEPH G. ALTHER
BY Frank L. Belknap
ATTORNEY

Patented June 1, 1937

2,081,971

UNITED STATES PATENT OFFICE 2,081,971

PROCESS OF HEATING OIL TO CRACKING TEMPERATURES

Joseph G. Alther, Chicago, Ill., assignor, by mesne assignments, to Universal Oil Products Company, Chicago, Ill., a corporation of Delaware Application February 15, 1932, Serial No. 592,972
Renewed October 21, 1935

1 Claim. (Cl. 196—47)

This invention relates to the heating of hydrocarbon oils to the high temperatures required for their conversion by radiant heat and the method is distinguished from other methods for using radiant heat in that the entire circumference or surface of all of the tubes of a radiant heating coil through which the oil is passed is exposed to direct radiation from a flame.

The application of direct radiant heat around the entire circumference of a fluid conduit offers numerous advantages over the old methods of subjecting the fluid conduit to direct radiant heat from one direction and reflected radiant heat from another. When both direct and reflected radiant heat are employed, that portion of the surface of the fluid conduit exposed to direct radiation from the source of heat, receives heat at an average rate approximately twice as great as the average rate of heating of that surface of the fluid conduit exposed only to reflected radiant heat. In the improved type of furnace of the present invention, heat is applied at a substantially uniform rate around the entire circumference of the fluid conduit by exposing the entire circumference to nascent (in contra-distinction to reflected) radiant heat energy. As an additional feature of the present invention, in order to further equalize the rate of heating around the entire circumference of the fluid conduit, an increment of heat may be super-imposed upon the fluid conduit at points on its circumference farthest removed from the source of heat. This super-imposed increment may be either in the form of convection heat obtained by the sweeping action of hot combustion gases passing between adjacent tubes of the fluid conduit or, when desired, fins may be attached to the tubes at the desired points to collect radiant heat and transmit it to the fluid conduit.

The distribution of heat intensity at various points around the circumference of the fluid conduit by different methods of heating may be more clearly illustrated by the attached flux diagrams (Figures 1, 2, 3 and 4) and the following description of the diagrams. These diagrams are not drawn to scale but an approximation of the different heat intensities on the various portions of the surface of the tube or fluid conduit is indicated by the relative magnitude of the several diagrams.

In Figure 1 the tube or fluid conduit T receives direct radiant heat from a source below the tube, parallel to the line A—B and receives reflected radiant heat from a source, for example from the roof or wall of the furnace, above the tube and also parallel to the line A—B. The distribution of heat intensity by this method of heating is indicated by the area enclosed in the curve 1. The area enclosed by curve 1A in this same figure represents the average heat intensity around the entire circumference of the tube.

Figure 2:
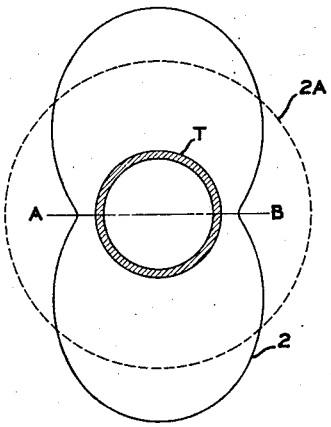

When the same tube T, indicated in Figure 2, is supplied with direct radiant heat from sources both above and below the tube parallel to the line A—B, the heat intensity at the different points around the circumference of the tube is indicated by the area enclosed in curve 2. The average heat intensity in this case is indicated by curve 2A.

Figure 3:
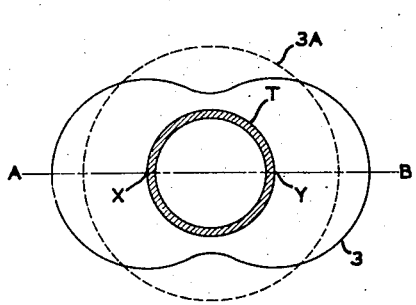

Referring to Figure 3, by attaching radiant heat collecting fins, not shown, to the external surface of tube T at points $x$ and $y$ along line A—B (at the points of minimum heat intensity) an additional heat component indicated by the area enclosed by curve 3 may be obtained. A convection heat component approximately corresponding in magnitude and direction to the additional heat component indicated by curve 3, may be obtained by omitting the heat collecting fins and allowing the hot combustion gases to flow between adjacent tubes in a direction perpendicular to line A—B. Curve 3A indicates the average heat intensity around the entire circumference of the tube due to this additional heat component alone.

Figure 4:
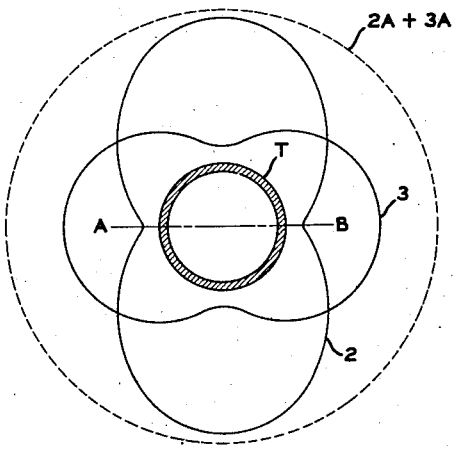

Figure 4 indicates the distribution of heat obtained by direct radiant heating from opposite sources, as indicated in Figure 2 and super-imposing additional heating by the use of fins or by convection, as indicated in Figure 3. The overlapping portions of the areas within curves 2 and 3 are additive and an average rate of heating around the entire circumference of the tube, equal to or even greater than the maximum obtained by direct radiant heating, may be secured by this method. Curve 2A+3A indicates the average in the case illustrated.

It should be understood that the flux diagrams shown are theoretical and based on a tube of negligible wall thickness. The heat conductivity of the tube wall will, of course, tend to give a more uniform heat distribution than that shown in the diagrams but will vary with tubes of different sizes and different wall thicknesses.

From the above it will be evident that by application of the present invention I may not only obtain substantially equal heat intensity around the entire tube circumference but also obtain an unusually high average rate of heat transfer for a given maximum intensity.

Among the advantages which accrue from the substantially uniform distribution of heat are the minimization of stress in the tube walls, due to unequal expansion, and the elimination of local overheating. These benefits are reflected in less deformity and longer life of the tubes and greatly decreased fire and explosion hazard. Elimination of local overheating of the oil undergoing conversion decreases the formation of coke and gas and thereby makes increased yields of desirable products possible. It is also evident that high tube efficiency is obtained by the present invention, permitting the use of a heating coil or fluid conduit of decreased size and higher fluid velocities (decreased time) in the coil for a given capacity and degree of conversion or, vice-versa, increased capacity for a heating coil of given size over that obtainable by the ordinary heating methods. Higher rates of heating may be employed in the furnaces of the present invention than are safe with other types of furnaces, without resorting to the use of special alloy tubes, due to the even distribution of heat over the entire tube surface and the minimization of unequal expansion stresses.

Two of the many possible specific structural forms which incorporate the features of the present invention are illustrated in the attached diagrammatic drawings (Figures 5, 6, 7 and 8). It will be understood that the approved forms illustrated do not limit the scope of the invention as some or all of the features of the invention may be incorporated in a wide variety of furnace structures.

Figure 6:
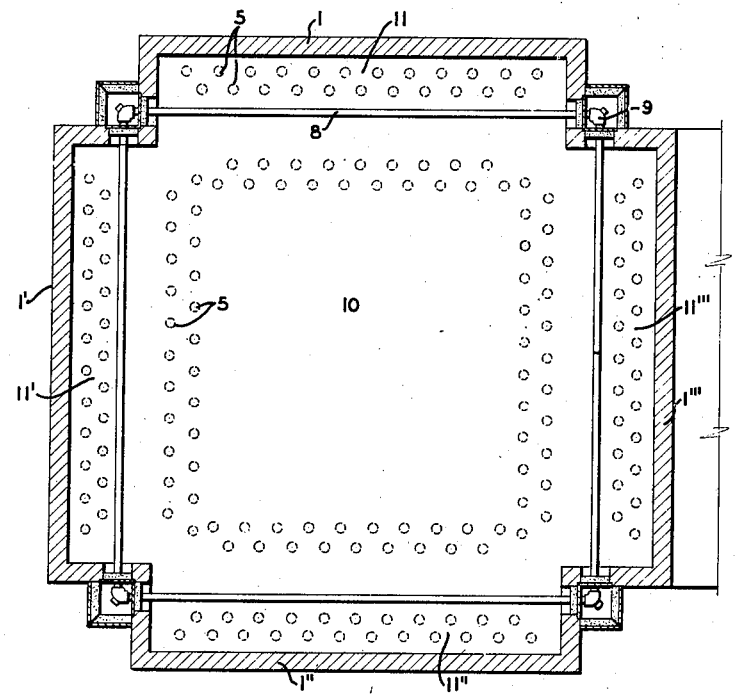
Figure 5:
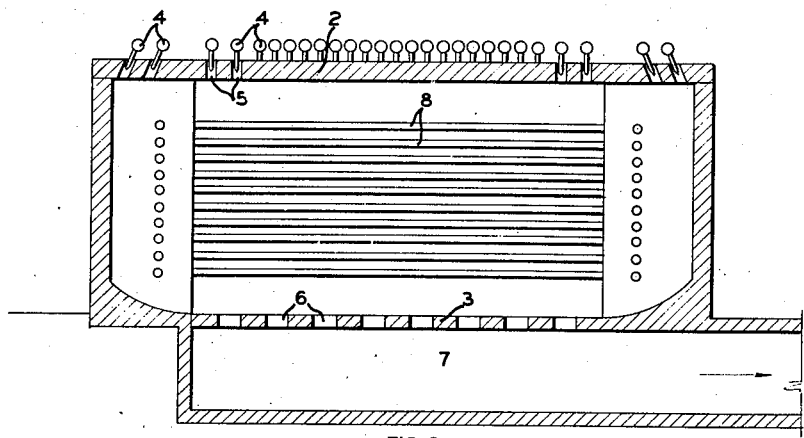

Referring now to Figures 5 and 6, which illustrate one specific form of furnace structure; Figure 5 is a sectional elevation of the furnace and Figure 6 is a sectional plan view of the same structure. The main furnace structure is composed of symmetrical outer walls 1, 1', 1" and 1''', a roof 2 and a floor 3. The furnace is fired from the top by means of burners 4 extending into firing ports 5, in roof 2. Hot combustion gases are removed through perforations 6, in the floor 3, and may pass from the furnace to a stack, not shown, through flue 7.

The fluid conduit consists of horizontally disposed tubes 8 extending between opposite side walls of the furnace and adjacent each of its four sides. The tubes may be connected in any well known manner to permit the desired flow through the fluid conduit and, as here illustrated, suitable right angle bends 9 connect the adjacent ends of the adjoining tubes, each tube being slightly inclined from the horizontal so that the entire fluid conduit or heating coil resembles, in the present instance, what may be termed a rectangular helix and the flow of oil therethrough is progressive from any tube through adjacent tubes along adjoining walls and finally, after completing the circuit around the four walls, back to the next lower tube in the same row. It should be understood that this is only one of the many specific manners in which the tubes may be connected and any desired flow through the heating coil may be employed within the scope of the invention.

Burners 4 and burner ports 5 are provided on both sides of each vertical bank of tubes, combustion zones being provided between each vertical bank of tubes and the adjacent side wall of the furnace, as well as within the central portion of the furnace so that each tube is exposed to direct radiation from the materials undergoing combustion in the furnace around its entire circumference.

It should be noted that the burners and firing ports between each side wall of the furnace and the adjacent tube bank are slightly inclined toward the side walls, allowing the flame to impinge upon the refractory walls of the furnace which may be heated thereby to incandescence and will supply additional radiant heat to the surfaces of the tubes facing the furnace walls. This serves to compensate, to some extent, for the smaller combustion space provided between the tube banks and the furnace walls, as compared with the combustion space provided in the central portion of the furnace.

In the furnace here illustrated, the hot combustion gases are removed only from the central combustion zone 10 by providing perforations 6, in floor 3, below only this portion of the furnace and a positive flow of hot combustion gases may be maintained between the tubes of the fluid conduit from the combustion zones 11, 11', 11" and 11''' between each bank of tubes and the adjacent furnace wall into the central combustion zone 10. In this manner an additional convection heat component similar to that illustrated in Figure 3 of the flux diagrams may be obtained. However, when it is desired for any reason, to limit or prevent the flow of combustion gases between the tubes, suitable fins or baffles, not illustrated in the drawings, may be provided between adjacent tubes of each vertical tube bank. Heat conducting fins attached to the tubes may be employed for this purpose when it is desired to obtain an additional heat component, such as illustrated in Figure 3 of the attached flux diagrams, by radiation to the fins and conduction from the fins to the tube walls. When this additional heat component is not desired, a non-heat conducting baffle may be employed instead of fins. In any of the cases above mentioned, but not illustrated in the drawings, additional perforations such as 6 may, when desired, be provided in that portion of the furnace floor beneath the combustion zones 11, 11', 11" and 11'''.

Figure 8:
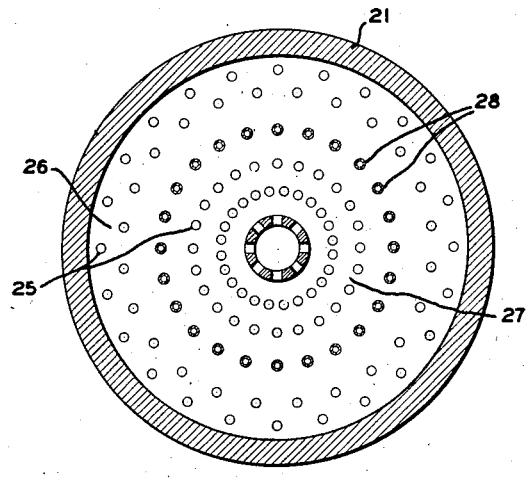
Figure 7:
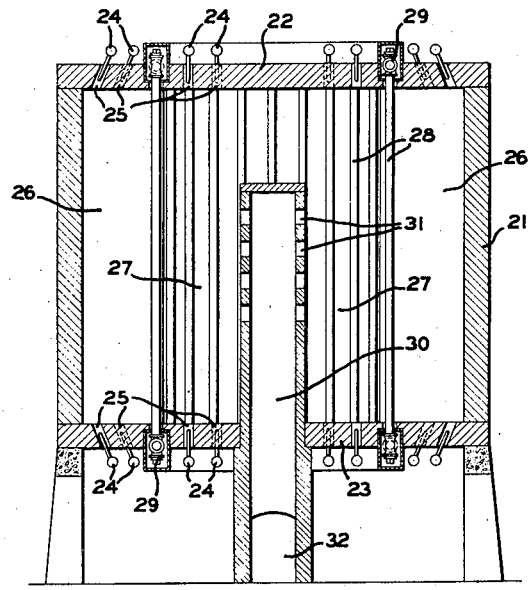

Referring now to Figures 7 and 8 which illustrate another specific form of furnace structure which may be employed within the scope of the invention, Figure 7 is a cross-sectional elevation of the furnace and Figure 8 is a sectional plan view of the same structure. The outer wall 21 of this furnace is circular, as viewed in Figure 8, and the tubes 28 of the fluid conduit or heating element are, in this particular case, arranged in circular form, each tube extending vertically between the roof 22 and the floor 23 of the furnace. In the case illustrated the tubes are arranged for series flow, suitable return bends 29 being provided to connect the ends of adjacent tubes.

The furnace here illustrated is fired from both the top and the bottom, burners 24 and burner ports 25 being provided both in the roof 22 and in the floor 23. It will be noted that burners 24 and firing ports 25 are provided both inside and outside of the circle formed by the fluid conduit. A combustion zone 26 is provided between the outer wall 21 and the fluid conduit and the combustion zone 27 is provided within the circle formed by the fluid conduit. It will be evident that, in this manner, each tube is exposed to direct radiant heat around its circumference and, as already described, in connection with Figures 5 and 6, the burners and burner ports adjacent the outer walls of the furnace are inclined slightly toward the walls for the same purpose as that already mentioned.

A central duct 30 extending into combustion zone 27 is provided through which combustion products may be removed from the furnace. Suitable perforations 31 may be provided through the walls of duct 30 to distribute the removal of combustion products and the combustion gases may pass from duct 30 through flue 32 to a suitable stack, not shown.

As mentioned in connection with Figures 5 and 6, suitable fins or baffles, not illustrated, may be provided between the tubes to prevent the flow of combustion gases between the tubes, in which case combustion products may be removed by suitable means, not illustrated in the drawings, from combustion zone 26 as well as from combustion zone 27.

The fact that the furnace structures shown are only two of the many designs which may incorporate some or all of the features of the present invention is again emphasized and it is also possible to employ many modifications of the furnace structures illustrated without departing from the scope of the invention. For example, the tubes of the heating coils in either furnace may be disposed either horizontally or vertically and either furnace may be fired from the top or from the bottom or from the sides or in any combination of these manners. It is also possible to employ more than a single row of tubes although more than two adjacent rows are not preferred and the tubes in these, when used, should be staggered or otherwise spaced so that the entire circumference of each tube is exposed to direct radiant heating. It is also within the scope of the invention to employ convection heating in combination with the heating means shown, by disposing an additional bank of tubes or fluid conduit in the path of the hot combustion products flowing from the combustion zones to the stack. Numerous other modifications will be readily apparent to those familiar with the art and it is my intention not to limit the invention to any specific form of furnace structure.

The following conservative figures may be taken as a specific example of the advantages offered by the use of a heater employing the features of the present invention. In a conventional type of radiant heat furnace from 65 to 78 percent of the total heat absorbed by the tubes is imparted to that portion of their surfaces exposed to direct radiation, which portion may be approximately 60 percent of the total tube surface. This figure of 65 to 78 percent varies, depending primarily upon the spacing of tubes. Assuming an average heat input of 10,000 B. t. u.'s per hour per circumferential sq. ft. of the total tube surface, the average for that portion of the tubes exposed to direct radiant heating will be, in round numbers, 13,500 to 15,500 B. t. u.'s per sq. ft. per hour while the unexposed surface will receive an average of only 4500 to 6500 B. t. u.'s per sq. ft. per hour. In other words the surface of the tubes exposed to direct radiation will receive two to three and one-half times the quantity of heat received by the remaining portion of the tube surface. The maximum rate of heating in the exposed surface will be from 17,000 to 19,000 B. t. u.'s per sq. ft. per hour with an average of 13,500 to 15,500, as above indicated. In a furnace of the improved design employed by the present invention, a maximum rate of heating 5 to 10 percent lower than that given above will give an average rate of heating over the entire heating surface of the tube 40 percent higher than in the conventional type of radiant heat furnace above described. On the other hand, utilizing the same maximum rate of heat transfer (17,000 to 19,000 B. t. u.'s per sq. ft. per hour) and a 20 percent different between the maximum and minimum rate of heat intensity around the circumference of the tube, an average rate of 15,000 B. t. u.'s per sq. ft. per hour can be secured in the heater of the present invention with a resultant saving of approximately 33 percent of the radiant heat surface over that required in the conventional radiant heater. Furthermore, since in modern radiant heaters of conventional design, some 60 percent of the tube surface absorbs an average of 75 percent of the total heat input, a heater of the design provided by the present invention may utilize 20 percent less heating surface for the same capacity. This economy is reflected in a smaller furnace structure as well as in a heating element of smaller surface.

I claim as my invention:

In the heating of hydrocarbon oils to cracking temperatures, the method which comprises passing the oil through a plurality of substantially horizontal conduits superimposed one above the other in a vertical plane within the furnace, projecting flame downwardly through the furnace on opposite sides of said plane, and transmitting direct radiant heat at a substantially uniform rate from the flames to the entire external surface of each of the conduits, and simultaneously maintaining a positive flow of hot combustion gases from a portion of the flames between and around the conduits.

JOSEPH G. ALTHER.